(12) United States Patent
Thamodharan et al.

(10) Patent No.: US 6,608,857 B2
(45) Date of Patent: Aug. 19, 2003

(54) METHOD OF CONTROLLING THE OUTPUT VOLTAGE OF A FURNACE

(76) Inventors: Manoharan Thamodharan, 1009 W. Abrams St. Apt. 17, Arlington, TX (US) 76013; Albrecht Wolf, Goslarsche Str. 81, Clausthal-Zekkerfeld (DE), 38678

( * ) Notice: Subject to any disclaimer, the term of this patent is extended or adjusted under 35 U.S.C. 154(b) by 0 days.

(21) Appl. No.: 09/846,885

(22) Filed: May 1, 2001

(65) Prior Publication Data

US 2001/0050941 A1 Dec. 13, 2001

Related U.S. Application Data

(62) Division of application No. 09/419,654, filed on Oct. 18, 1999, now Pat. No. 6,226,313.

(51) Int. Cl.[7] .............................................. H05B 7/144
(52) U.S. Cl. ....................................... 373/102; 373/104
(58) Field of Search .......................... 373/47, 49, 102, 373/103, 104, 105, 108, 2; 323/210, 211

(56) References Cited

U.S. PATENT DOCUMENTS

| 4,677,643 A | * | 6/1987 | Dicks ........................ 373/105 |
| 5,463,653 A | * | 10/1995 | Du Parc et al. ............ 373/108 |
| 6,226,313 B1 | * | 5/2001 | Thamodharan et al. ..... 373/102 |

* cited by examiner

Primary Examiner—Tu Ba Hoang

(57) ABSTRACT

A new control method is used to regulate the reactive power consumption of an electric arc furnace. Active and reactive power values are used space vector variables and serve as control parameter of the power source, which consists of a furnace transformer with current controllers and a booster transformer. This method helps maintain constant reactive power consumption, reduce flicker at the point of common coupling and minimize the disturbances in the power system.

5 Claims, 3 Drawing Sheets

METHOD OF CONTROLLING THE OUTPUT VOLTAGE OF A FURNACE

CROSS-REFERENCE TO RELATED APPLICATIONS

This application is a divisional of patent application Ser. No. 09/419,654 filed Oct. 18, 1999, now U.S. Pat. No. 6,226,313

BACKGROUND OF THE INVENTION

1. Field of the Invention

The invention is directed in general to electric arc furnaces, and more particularly to a new power source and its control for electric arc furnaces, such as three-phase electric arc furnaces, which enables the reactive power consumption to be kept constant, thus reducing flicker at the point of common coupling. Furthermore, the dynamic performance can be increased. Such arc furnaces may be used, for example, for the production of steel and iron from scrap-metal, for melting non-ferrous materials such as for example aluminum and in chemical processing industries. Of course, such furnaces are not limited to use in the foregoing manners, and instead are contemplated for use in a variety of settings.

2. Background Art

Generally, for an electric arc furnace, such as a three-phase electric arc furnace, the commonly used power source consists mainly of a furnace transformer, which is generally connected directly to a high voltage power system. In particular, the prior art such a connection in principally two different manners. First, this may be accomplished by way of a block circuit comprising pre-transformers and a furnace transformer or through the most approved variation by the direct connection of the furnace transformer with an intermediate circuit to the power system. This connection operates with medium voltage and is therefore relatively less expensive.

In the second case, the furnace transformer with the intermediate circuit comprises a main transformer and a magnetic-decoupled booster transformer (See, for example, Kaempf, P.; Markworth, E.; Mühlenbeck, J.: 110 kV-Lichtbogen-schmelzofen mit Lastschaltung im Zwischenkreis, Stahl u.Eisen 94(1974) Nr.9, S. 393 and Brehler, R.: Ofentransformatoren zum Speisen von Lichtbogenöfen mit Ofenschalter im Zwischenkreis, Siemens-Zeitschrift 50(1976), Nr.1, S. 9–17).

In such an example, the booster transformer has a half-rated power relative to overall furnace power. The voltage of the intermediate circuit is set at a medium voltage level (NEC Standard). The furnace switch operates with a medium voltage (NEC Standard) and can be switch on with a lower furnace power (50% of the furnace power). In such an example, a dynamic Var compensator meant for compensating fundamental and distortion reactive power can be integrated into the intermediate circuit. Lastly, the furnace is connected to the high voltage power system through the high voltage circuit breaker.

In another such prior art embodiment, a further modification of the above power source has been made. Such a modification comprises a thyristor current controller and a variable inductance per phase (See, for example, Dicks, U.S. Pat. No. 4,677,643). The thyristor current controller with the variable inductance short-circuits the main reactance of the booster transformer whenever the main thyristor current controller faces a current cut off and is blocked.

Generally, with all of these conventional three-phase electric arc furnaces, undesired distortions in the power system having a low short-circuit capacity in the form of voltage fluctuations occur. This results in a flicker, at the point of common coupling. Such flicker is due to the fluctuating reactive power consumption of the furnace. In addition, with respect to the embodiment shown in Dicks '643, the inductance produces power loss and the circuit is associated with a low dynamic response due to the longer dead time produced between the changes in the delay angle.

To solve the foregoing problems, sophisticated and expensive electrical equipment, such as a dynamic Var compensator, is required to compensate for the distortions. Further, other disadvantages to such systems are the poor quality of power regulation, as the power yield can be varied only in stages and only in greater time distance. As a result, this process can lead to wear of the switching components.

Thus, it would be an object of the invention to provide an electronic-controlled furnace transformer together with a new control concept, which enables the reactive power consumed by the furnace to be kept constant. This is made possible if the conventional power system of the three-phase electric arc furnace disclosed in the '643 patent is supplemented with a zero voltage switch instead of the variable inductance. The new control concept enables the regulation of the (reactive) power input and through this method the disturbances in the power system and the excessive power loss can be reduced to a minimum. Moreover, in one embodiment the dynamic Var compensator can be replaced with a less complex and relatively cheap static Var compensator (SVC).

SUMMARY OF THE INVENTION

The invention comprises a power source for an arc furnace having an intermediate circuit transformer with a AC main-driven converter. The AC main-driven converter comprises a current controller and a zero voltage switch. Both of the current controller and the zero voltage switch are integrated in the intermediate circuit.

In a preferred embodiment of the invention, the arc furnace comprises a three-phase arc furnace and the a AC main-driven converter comprises a three phase current controller and zero voltage switch.

In another preferred embodiment, the invention further includes means for regulating the reactive power through the phase control of the three-phase current controller.

In another preferred embodiment, the invention further includes means for compensating for unsymmetrical loads by regulating the phase control of the three-phase current controller in each phase separately.

In yet another preferred embodiment, the converter in the intermediate circuit includes means for maintaining the power system current substantially constant.

In yet another preferred embodiment, the intermediate circuit includes a reactive power compensator that comprises a static or dynamic Var compensator.

The invention further includes a method for controlling the output voltage of a furnace comprising the steps of: (a) rough adjusting output voltage with a transformer; and (b) fine tuning the output voltage by varying the firing angle of the converter.

BRIEF DESCRIPTION OF THE DRAWINGS

The invention can be explained through a brief description of the following drawings, wherein.

BEST MODE FOR PRACTICING THE INVENTION

Figure 1:
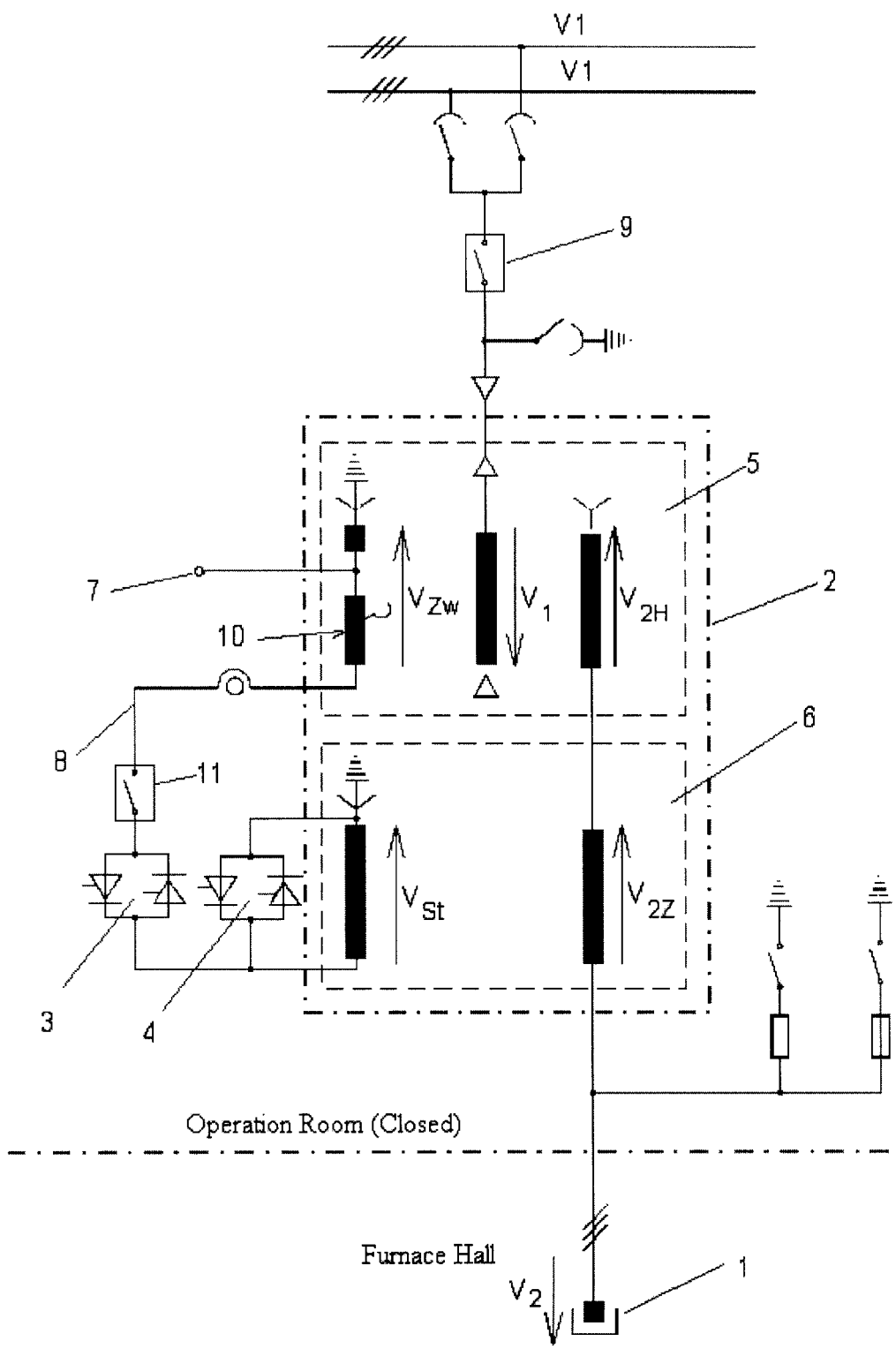
FIG. 1 shows the circuit diagram of the invention.

While this invention is susceptible of embodiment in many different forms, there is shown herein in the drawings and will be described in detail specific embodiments, with the understanding that the present disclosure is to be considered as an exemplification of the principles of the invention and is not intended to limit the invention to the embodiments illustrated.

The circuit of the power source per phase for the three-phase arc furnace 1 is shown in FIG. 1 as comprising, in part, intermediate circuit transformer 2 with a thyristor current controllers 3 and a zero voltage switch 4. Unlike the circuitry of the prior art explained above, this new power source includes a zero voltage switch 4 that is integrated into the intermediate circuit.

Figure 2:
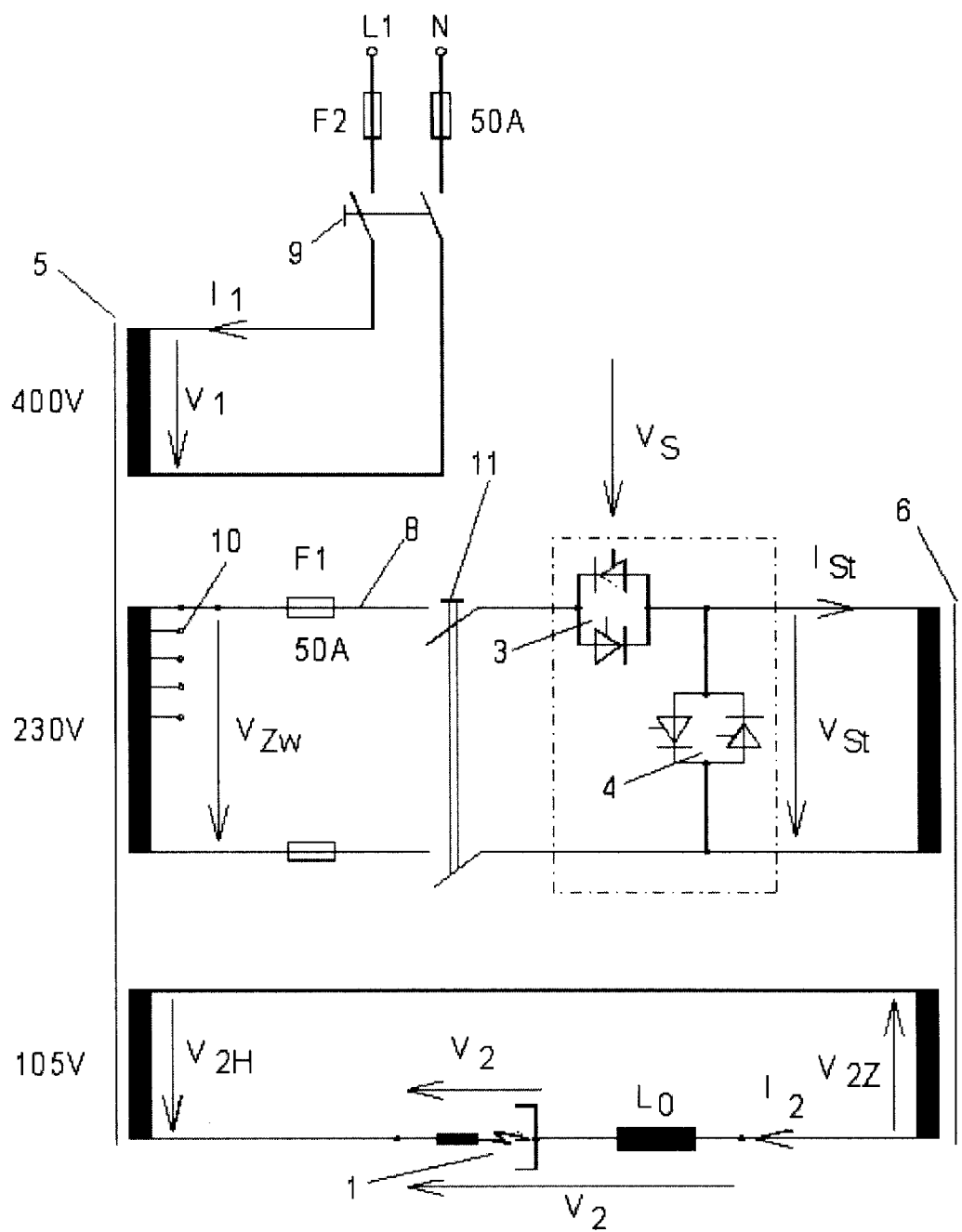
FIG. 2 shows the circuit diagram of the invention in a single phase embodiment.

In particular, the furnace transformer comprises of a main transformer 5 and a magnetic-decoupled booster transformer 6. The booster transformer has a lower rated power, such as a half-rated power relative to total furnace power. The voltage of the intermediate circuit is set at that of a medium voltage level (NEC Standards). All switching operation is done in the intermediate circuit thus allowing the switching of 50% of the furnace power. A static Var compensator (SVC) (capacitor bank) 7 is meant for compensating the fundamental and distortion reactive power can be integrated into the intermediate circuit 8. While a static Var compensator is preferred due to its lower cost, a dynamic Var compensator is likewise contemplated for use. The furnace is connected to the high voltage power system $V_1$ through the high voltage circuit breaker 9, wherein $V_2$ labeled in FIG. 2 represents the output voltage of furnace.

The furnace transformer in the intermediate circuit allows not only the direct connection to the high voltage power system without the use of the relatively expensive high voltage switch as the furnace switch for the transformer but also allows the switching and control with thyristors. In particular, the thyristor current controller 3 and zero voltage switch 4 represent the AC main driven converter in the intermediate circuit of the transformers. They essentially comprise per phase of a main thyristor current controller 3 and a zero voltage switch 4. The zero voltage switch short-circuits the main reactance of the booster transformer whenever the main thyristor current controller 3 faces a current cut off and is blocked.

The converter output voltage $V_{St}$, which is identical to the primary voltage of the booster transformer, can be altered between 0% and 100% of the intermediate circuit voltage $V_{zw}$, by way of the firing angle of the converter. The booster transformer is connected in such a way, that the output voltage of the main transformer $V_{2H}$ adds up with the voltage of the booster transformer $V_{2Z}$ in the load circuit to produce output voltage $V_2$ that can be varied between the half and full-rated voltage Since the power of the furnace is dependent on the square of the output voltage, the adjustable power range will therefore lie between 25% and 100% of the full rated power of the furnace. The control method for the system, the Vector-Control Method, has the advantage that only the complex variables (vectors) are taken into account. Time dependent values such as the sinus waveform of the three-phase system and the smoothing of the actual value can thus be left out and not considered, thus, enabling the actual value to be realized without delay. Reactive power and effective power are used as space vector variables and serve as control parameters for the converter. This operation of this furnace is as follows: The transformer 2 with taps 10 in the intermediate circuit 8 is generally used for purposes of rough adjustment of the output voltage. The current controller 3 then provides a large adjustable reserve and, the fine tuning is made by varying the firing angle of the converter. The firing angle is derived from the analysis of instantaneous effective and reactive powers (Vector Control Method). This method helps maintain the reactive power at a constant value and prevents the undesired harmonics in the power system caused by the large or drastic changes in firing angle. The constant reactive power consumption stabilizes the power system. Its voltage and current can thus be maintained at a constant value. The power yield (effective power) of the furnace for any metallurgical and chemical purpose can be kept constant and optimized easily. The capacitor bank, in this case a static VAR compensator, provides the necessary inductive reactive power. Again this bank may likewise comprise a dynamic VAR compensator or other known system This circuit concept and operating method is an advance over the currently utilized and conventional power supplying equipment of the three-phase arc furnace. In particular, with the above-identified embodiment, the inductance utilized in the prior art can be removed, thus reducing the cost and extra power loss. Moreover, this increases the dynamic performance of the system. The wear of the furnace switch 11 can be reduced as well, since it can be turned on without being energized. In addition, the converter can be controlled by way of the Vector Control method which has not been previously applied to furnace control.

Figure 3:
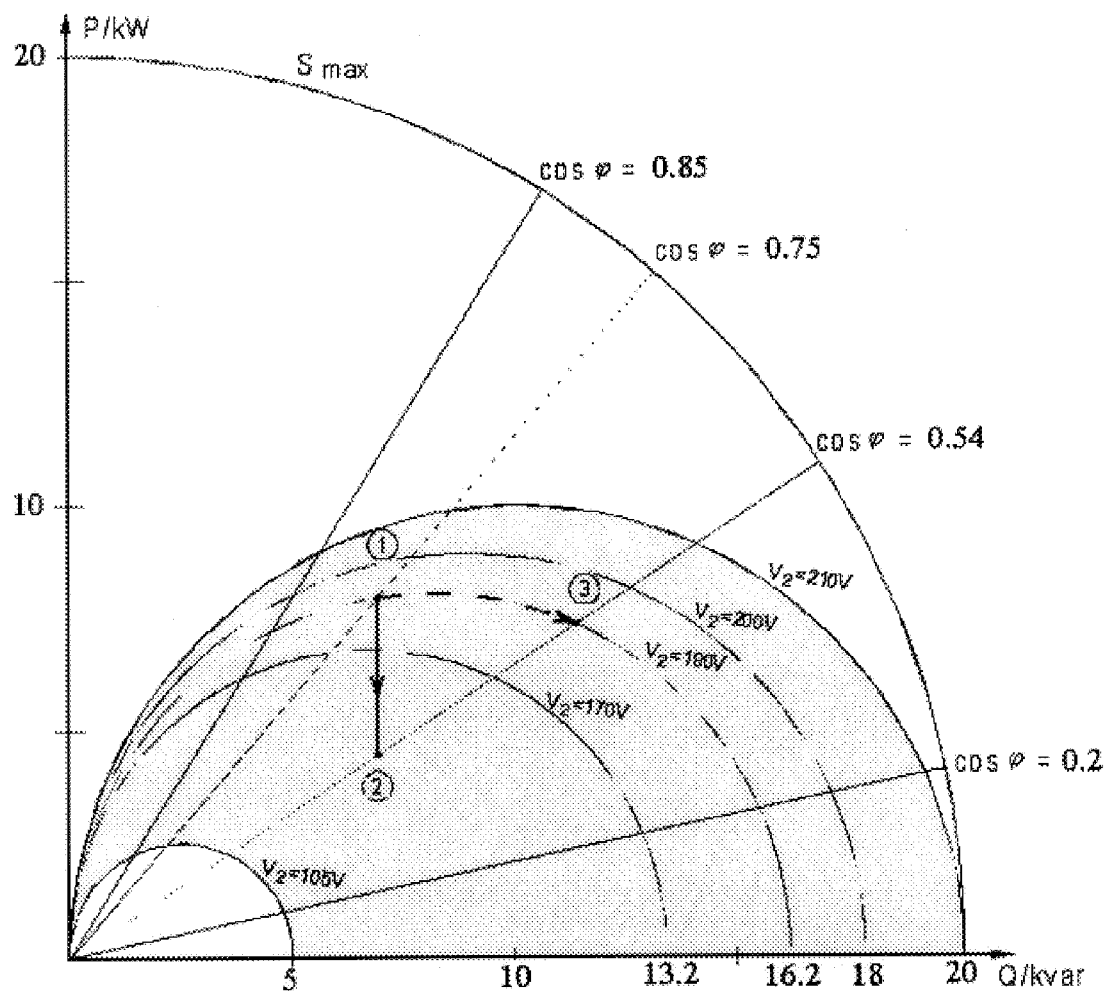
FIG. 3 shows the capability curve.

Certain testing were carried out in a laboratory setting. As shown in FIG. 3, the capability curve of the results has been provided. On the abscissa is the effective power P and on the ordinate is the reactive power Q. Without power regulation, the operation point moves with changes in arc parameter for a constant output voltage $V_2$ from point 1 to point 3 along the semicircle characteristic curve. It can be observed here that big consumption of reactive power, which leads to the voltage fluctuation in the power systems and flicker. With the main-driven converter, the operation point moves for a constant voltage from point 1 to point 2 in the darker region. Both the operation points experienced a similar power factor change in load. Thus, the advantages of the present invention can be seen in these curves.

The invention is equally applicable with single-phase power, and it will be understood to one of skill in the art that the foregoing embodiment, which is depicted in a three-phase power circuit, can be modified for use with single-phase power. Such a circuit diagram for single phase is shown in FIG. 2. $V_S$ represents the control voltage for the converter The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What I claim is:

1. A method for controlling an output voltage of an electric arc furnace comprising the steps of:

providing an electric arc furnace having an intermediate circuit transformer including a magnetic decoupled booster transformer and an AC main-driven transformer having a plurality of taps for adjustments of said output voltage;

providing an intermediate circuit for the arc furnace, the intermediate circuit comprising a current controller and a zero voltage switch;

adjusting said adjustment of the output voltage with the main driven transformer by tapping said taps; and tuning the output voltage by varying a firing angle of the AC main-driven transformer.

2. The method of claim 1 wherein the method further comprises the step of:

maintaining an active power constant.

3. The method of claim 1 wherein the method further comprises the step of:

maintaining a reactive power constant.

4. The method of claim 1 wherein the method further comprises the steps of:

maintaining an active power constant; and maintaining a reactive power constant.

5. The method of claim 1 further comprising the steps of:

analyzing at least one of a reactive power and an effective power as space vector variables; and utilizing one of the space vector variables as parameters for at least tuning the AC main-driven transformer.

* * * * *